(No Model.) 2 Sheets—Sheet 2.

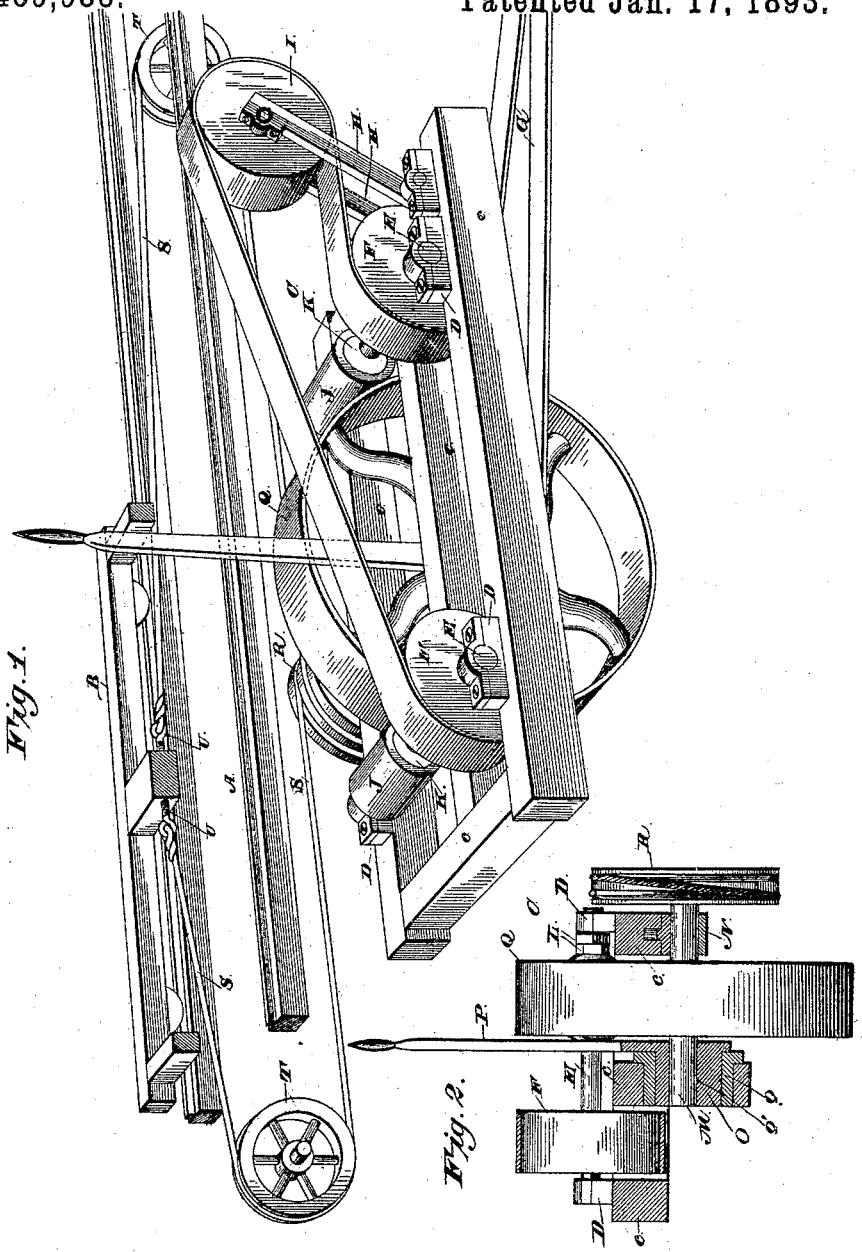

F. O. SCHROEDER.
SAWMILL CARRIAGE FEED.

No. 489,988. Patented Jan. 17, 1893.

Witnesses
M. Fowler
D. P. Nolhaupter

Inventor
Frank O. Schroeder
By his Attorneys,
C A Snow & Co.

UNITED STATES PATENT OFFICE.

FRANK O. SCHROEDER, OF OAK HARBOR, OHIO.

SAWMILL-CARRIAGE FEED.

SPECIFICATION forming part of Letters Patent No. 489,988, dated January 17, 1893.

Application filed February 5, 1892. Serial No. 420,438. (No model.)

*To all whom it may concern:*

Be it known that I, FRANK O. SCHROEDER, a citizen of the United States, residing at Oak Harbor, in the county of Ottawa and State of Ohio, have invented a new and useful Sawmill-Carriage Feed, of which the following is a specification.

This invention relates to saw mill carriage feeds; and has for its object to provide a machine of this character which can be used in connection with the reciprocating carriage of any saw mill, and which while simple in construction and easy of manipulation, at the same time provides for an accurate and positive feed of the carriage, and is also connected with the carriage in such a manner as to saw a much longer log than the length of the carriage, and one in which the proper amount of feed can be accurately regulated as stated.

With these and many other objects in view which will readily appear as the nature of the invention is better understood, the same consists in the novel construction, combination and arrangement of parts hereinafter more fully described, illustrated and claimed.

Figure 3:
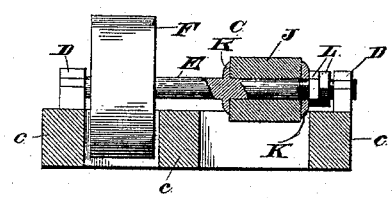
Figure 4:
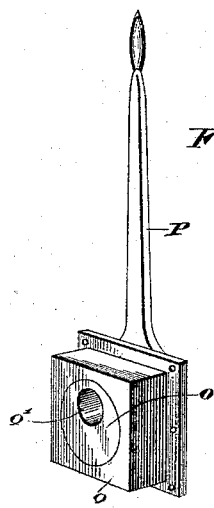

In the accompanying drawings;—Figure 1 is a perspective view of a saw mill carriage and feeding device connected therewith as contemplated by this invention. Fig. 2 is a vertical transverse sectional view of the feeding mechanism. Fig. 3 is a similar view through one of the drive shafts. Fig. 4 is a detail in perspective of the oscillating eccentric bearing.

Referring to the accompanying drawings;— A represents the ordinary track upon which travels the saw mill carriage B, of any construction whatever, and which is designed to be connected with and controlled by the feeding mechanism to be described, said track of course being located upon the floor of the mill as usual. Suitably secured and located beneath the floor of the mill, and the track A thereon, is the fixed feeding mechanism frame C. The said frame C comprises several side and end pieces c, joined together to form an approximately rectangular frame, carrying the various parts of the feeding mechanism. Journaled in suitable boxes D near each end of said frame and upon the top thereof are the parallel drive shafts E. Mounted upon said shafts adjacent to one side of the frame C are the drive wheels or pulleys F which receive the drive belt G passing thereover and communicating power thereto. Located at one end of the frame C and adjacent to one of the drive pulleys F are the upwardly extending bearing arms H carrying at their upper ends the off-standing idler pulley I adjacent to and above one of the pulleys F. The said idler pulley I takes the belt from around one side of both the adjacent and opposite pulleys F and not only serves to reverse the direction of travel of the said pulleys and their respective shafts, but also provides for a long and greater area of belt contact for the feeding mechanism. The said belt G is driven from the saw arbor or other suitable power which communicates a continuous motion to the parallel driving shafts E. Mounted upon each of the parallel drive shafts E adjacent to the opposite side of the frame C, are the friction wheels J. The said friction wheels J are preferably of paper to insure certain contact between said wheels and the wheel which they drive. The said friction wheels are secured to the drive shafts E by means of the clamping flanges K, the inner of which are shrunk upon the shaft so as to dispense with the ordinary keys and set screws, while the other flanges are slipped over the shafts against the said wheels and are held thereon by means of the right and left binding nuts L, bearing thereagainst and providing for a self tightening clamp for the wheels as they revolve.

A supplemental drum shaft M is journaled beneath the frame C and centrally thereon. One end of the shaft M is mounted in the swinging bearing N, located at one side of the frame C, while the inner end of said shaft is journaled in the oscillating eccentric bearing block O. The said eccentric bearing block O is mounted to oscillate in a suitable boxing *o*, secured to one of the central frame pieces of the frame C and is provided with a centrally disposed perforation *o'*, to receive the end of the shaft M, and with an upwardly extending operating lever P, which projects through the floor of the mill, and is controlled by the operator to throw the shaft M to one side or the other to cause the cable drive wheel Q, carried thereby, to be thrown against either of the friction wheels J, according to the direction of travel of the saw carriage.

Mounted upon the outer end of the cable shaft M is the grooved cable drum R. The carriage controlling cable S is passed around said drum R and runs from the upper side of the same under the track or floor to the grooved wheels T journaled at suitable points, at opposite ends of the track and projecting through the floor between the same. From said grooved wheels T the operating cable S passes to the central cross beam of the carriage B and directly beneath the same. At such point the ends of the cable are connected with the adjusting eye bolts U which are secured to said central cross-beam and are adapted to take up any slack which may be in the cable. Such connection of the cable with the carriage provides for a greater length of feed of the same as will be readily apparent, inasmuch as said cable or rope is fastened beneath the center of the carriage and thus allows one end of the carriage to be run clear over the wheel around which the cable runs at each end of the mill, said wheels being preferably of wood to prevent wearing and cutting of the cable.

It will be readily seen that by controlling the eccentric bearing lever P, the cable drive wheel Q can be quickly and readily thrown against either of the continuously revolving friction pulleys at each end of the frame to immediately change the direction of the carriage and accurately and positively regulate the feed of the same.

The construction, operation and many advantages of the herein described feeding mechanism for saw mill carriages are apparent without further description.

Having thus described my invention, what I claim and desire to secure by Letters Patent is:—

1. In a feeding mechanism, the combination with a fixed frame; of opposite parallel drive shafts journaled upon said fixed frame, drive pulleys mounted upon one end of said drive shafts, an off-standing idler pulley supported at one end of the frame adjacent to and above one of the drive pulleys, a belt passing around one side of both of said drive pulleys and the adjacent idler near one of the pulleys, friction wheels mounted on said drive shafts at their other ends and within the frame, a movable drum shaft loosely journaled beneath said frame, a drive pulley mounted upon the drum shaft and working between said friction wheels, a cable drum upon one end of the drum shaft, and means for swinging said drum shaft to move the drive wheel thereon alternately against said friction wheels, substantially as set forth.

2. In a feeding mechanism, the combination with a fixed frame; of opposite parallel drive shafts, drive pulleys at one end of said shafts, opposite reversely rotating friction wheels mounted on said drive shafts within the frame, an off-standing idler supported adjacent to and above one of said drive pulleys, a drive belt passing around one side of both of said drive pulleys and around said idler, an oscillating eccentric bearing block mounted under said fixed frame and provided with an eccentric perforation and an upwardly extending operating lever, a drum shaft loosely journaled near its outer end beneath said frame and having its other inner end mounted in said eccentric perforation, a drive wheel mounted upon said drum shaft and adapted to work between and against said friction wheels, and a cable drum mounted upon the outer end of the drum shaft, substantially as set forth.

In testimony that I claim the foregoing as my own I have hereto affixed my signature in the presence of two witnesses.

FRANK O. SCHROEDER.

Witnesses:
JOHN BROWN,
DANIEL H. JAMES.